J. BUEB.
PROCESS FOR OBTAINING CYANOGEN AND ITS COMPOUNDS.
APPLICATION FILED OCT. 1910.
1,032,988.
Patented July 16, 1912.
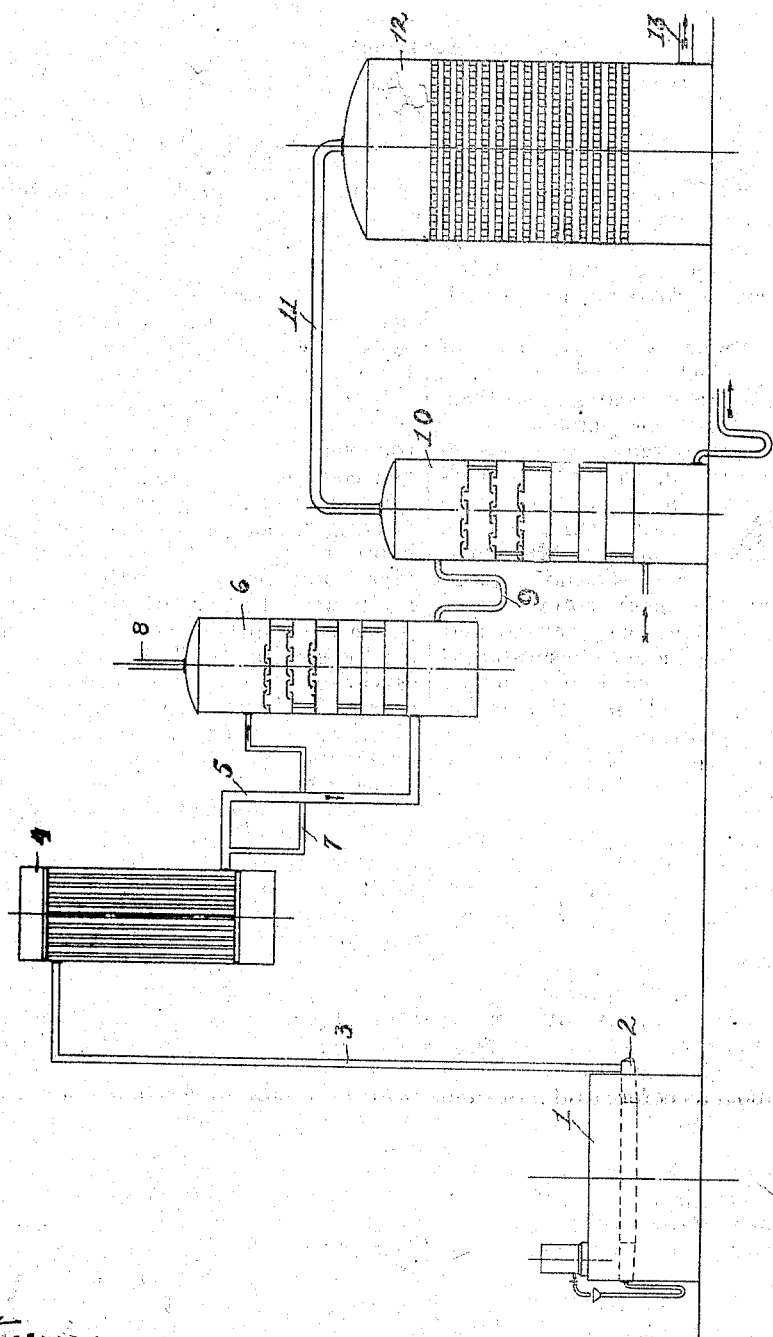

UNITED STATES PATENT OFFICE.

JULIUS BUEB, OF DESSAU, GERMANY.

PROCESS FOR OBTAINING CYANOGEN AND ITS COMPOUNDS.

1,032,988.  Specification of Letters Patent.  Patented July 16, 1912.

Application filed October 26, 1910. Serial No. 589,257.

*To all whom it may concern:*

Be it known that I, JULIUS BUEB, a subject of the German Emperor, and resident of Dessau, Germany, have invented certain new and useful Improvements in Processes for Obtaining Cyanogen and its Compounds, of which the following is a specification.

My invention relates to the utilization of the distillation products of distiller's waste, and has for its object to obtain from them cyanogen and cyanogen compounds.

In processes hitherto known, the gases resulting from the distillation of distiller's waste are heated to such a high temperature that the substances therein which can be cyanized are converted into cyanogen compounds, but in such processes a large quantity of indifferent substances, not capable of conversion into cyanogen compounds, and of steam exceeding in amount the substances capable of being converted into cyanogen compounds, are heated with the latter to the required high temperature necessitating a large expenditure of fuel. These non-cyanizable substances dilute those that are cyanizable to such an extent that a part of the latter escape the cyanizing action while being heated and leave the heating apparatus without being converted into cyanogen compounds, so that only a low yield is obtained.

The object of the present invention is to overcome the above noted objections and it provides for treating the gases and vapors from distiller's waste to separate therefrom the substances which cannot be converted into cyanid compounds before said gases and vapors are superheated to form cyanogen compounds.

The accompanying drawing illustrates, more or less conventionally, one form of apparatus adapted for carrying out the process hereinafter more particularly described.

The apparatus illustrated comprises a carbonizing furnace 1 with a retort 2 having a suitable inlet and outlet. The retort outlet is connected by a pipe 3 with a condenser 4, preferably operated with water. A pipe 5 connects the lower portion of the condenser with the lower portion of a scrubber 6 and a branch 7 of said pipe leads to the upper portion of the scrubber which latter is provided at its upper end with a gas outlet 8. The scrubber is connected through a pipe 9 with a distilling column 10 and a pipe 11 leads from the latter to a cyanizing heater 12 which is provided with a gas outlet 13.

In carrying out the invention the gases and vapor-like products passing off from the outlet 2 during the carbonization process at a temperature of from 100–200° C. are conveyed through pipe 3 into the condenser 4. This condenser is cooled with water whereby the temperature of the gaseous substances is reduced to that of the atmosphere and part of them are liquefied. The condensate carries only a part of the nitrogen compounds capable of conversion into cyanogen-compounds, the greater part still existing in gaseous form, which is recovered, however, by conducting the gas through pipe 5 into the scrubber 6 and there washing it with the condensate mentioned above which is conducted to the top of the scrubber by the pipe 7. This washing process is carried out on the principle of the "counter-current". In this way all the constituents of the gases, which are cyanizable are taken up by the condensate which is thereby enriched while the components which are not capable of being condensed, because they are insoluble in the condensate, escape in the gaseous form through outlet 8 and are, as they are combustible, utilized for heating the carbonizing furnace, or for other heating purposes. The condensate which is rich in nitrogen, is conducted through pipe 9 to column 10 where it is subjected to a distilling process at a temperature which lies below the boiling point of the liquor, whereby is obtained a distillate of compounds, which is now free from water and substances incapable of conversion into cyanogen compounds, and this is then supplied to the cyanizing heaters 12. The cyanization of the distillation products is carried on at a temperature of about 1,000° C. and owing to the hereinbefore described removal of non-cyanizable substances, the process is carried on easily and perfectly, the cyanogen gases thus obtained, and composed to a large extent of hydrocyanic acid, leaving the heater 12 through the outlet 13 and may be subsequently absorbed and transformed into alkali-cyanid in the way well known in the art. There is also the advantage that the gases supplied to the cyanizing heater are free from substances which become carbonized at the high heating temperature and thus might obstruct the flues;

these substances are not however wasted since, as already mentioned, they can be used for heating purposes. The technical and economical advantages of the present process are obvious to every expert in the art.

The components of the liquid, obtained by condensing and washing the gaseous substances in the way described above, with reference to their ability to be converted into cyanogen compounds are: methylamin, dimethylamin, trimethylamin and higher homologues, ammonium carbonate and some nitrogenous bodies of unknown constitution.

The separation of trimethylamin from the gases of the distiller's waste and its subsequent cyanization have already been described in technical literature. Owing however to the fact that the said gases contain, besides trimethylamin, other substances capable of conversion into cyanogen compounds, this isolation of the trimethylamin alone proved unsatisfactory from technical and economical points of view, so that the process was soon discarded in this industry.

A great advantage of the present process is that the yield of cyanogen-compounds is a perfect one, for no losses are sustained by the operations of depriving the gases of the cyanizable compounds as well as by distilling these compounds from the highly enriched washing fluid. The hereinbefore described process for the treatment of the gases from the carbonization of distiller's waste can also be applied wherever gases and vapors can be dealt with which consist partly of cyanizable, and partly of non-cyanizable substances.

It will of course be understood that the invention is not limited to the use of any particular apparatus and may be carried out with parts constructed and arranged very different from those illustrated, the illustration being furnished merely to show conventionally one form of apparatus adapted for carrying out the process.

Having thus described the invention, what is claimed is:

1. The herein-described improvement in the process of manufacturing cyanogen compounds from the gases and vapors produced during the carbonization of nitrogenous substances, such as distiller's waste, comprising separating said gases and vapors into their cyanizable and non-cyanizable constituents, and then treating the cyanizable constituents to effect transformation thereof into cyanogen compounds.

2. The herein-described improvement in the process of manufacturing cyanogen compounds from the gases and vapors produced during the carbonization of nitrogenous substances, such as distiller's waste, comprising separating said gases and vapors into their cyanizable and non-cyanizable constituents by cooling the same and then treating the cyanizable constituents to effect transformation thereof into cyanogen compounds.

3. The herein-described improvement in the process of manufacturing cyanogen compounds from the gases and vapors produced during the carbonization of nitrogenous substances, such as distiller's waste, comprising cooling said gases and vapors to liquefy such as are condensable, washing the gases and vapors with the condensate obtained by such cooling operation, and then treating the cyanizable gases to effect transformation thereof into cyanogen compounds.

4. The herein-described process of manufacturing cyanogen compounds from the gases and vapors produced during the carbonization of nitrogenous substances, such as distiller's waste, consisting in cooling said gases and vapors to liquefy such as are condensable, washing the gases and vapors with the condensate obtained by the cooling operation, liberating the nitrogenous substances contained in the washing fluid, and then treating the cyanizable gases to effect transformation thereof into cyanogen compounds.

In testimony whereof I have signed my name to this specification in the presence of two subscribing witnesses.

JULIUS BUEB.

Witnesses:
RUDOLPH FRICKE,
ALBERT R. MORAWETZ.